US011250846B2

(12) United States Patent
Saraf et al.

(10) Patent No.: US 11,250,846 B2
(45) Date of Patent: Feb. 15, 2022

(54) VOICE ENABLED SEARCHING FOR WIRELESS DEVICES ASSOCIATED WITH A WIRELESS NETWORK AND VOICE ENABLED CONFIGURATION THEREOF

(71) Applicant: ARRIS Enterprises LLC, Suwanee, GA (US)

(72) Inventors: Somesh Saraf, Bangalore (IN); Karthick Somalinga Nagarajamoorthy, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 120 days.

(21) Appl. No.: 16/228,701

(22) Filed: Dec. 20, 2018

(65) Prior Publication Data

US 2020/0202850 A1 Jun. 25, 2020

(51) Int. Cl.
*G06F 15/00* (2006.01)
*G10L 25/00* (2013.01)
(Continued)

(52) U.S. Cl.
CPC .............. *G10L 15/22* (2013.01); *G10L 15/26* (2013.01); *G10L 15/30* (2013.01);
(Continued)

(58) Field of Classification Search
CPC ....... H04W 4/029; H04W 4/80; H04W 4/021; H04W 84/12; H04W 12/00503; H04W 4/02; H04W 48/16; H04W 36/08; H04W 8/005; H04W 88/08; H04W 12/08; H04W 48/08; H04W 64/003; H04W 4/30;
(Continued)

(56) References Cited

U.S. PATENT DOCUMENTS 9,582,983 B2 2/2017 Dadu et al.
10,580,407 B1* 3/2020 Sriram .................... G10L 15/22
(Continued)

FOREIGN PATENT DOCUMENTS

WO 2007053257 A1 5/2007

OTHER PUBLICATIONS

ARRIS HomeAssure; "Coverage, Simplicity and Control for the Wi-Fi Connected Home", ARRIS Enterprises LLC paper, 2017.

*Primary Examiner* — Michael Ortiz-Sanchez
(74) *Attorney, Agent, or Firm* — Wenderoth, Lind & Ponack, L.L.P.

(57) ABSTRACT

Utilizing a voice capturing device (e.g., smart phone, tablet, smart speaker) to capture voice commands and send the voice commands to a cloud based voice recognition/processing engine to convert the commands to text commands. Processing the text commands at an access point for a WiFi network. The voice commands may include search queries about particular wireless devices that are associated with the WiFi network. The access point may search the configuration and connectivity data for the WiFi network to determine what access point the wireless device is connected to and a location for the access point. The result of the search may be announced to the user via the voice capturing device. The voice activated search may be to find wireless devices that have misplaced or for inventory management. The voice activated commands may also include voice WiFi network configuration commands.

14 Claims, 6 Drawing Sheets

(51) Int. Cl.
*G10L 15/22* (2006.01)
*H04W 4/02* (2018.01)
*H04L 41/0866* (2022.01)
*G10L 15/30* (2013.01)
*H04W 64/00* (2009.01)
*G10L 15/26* (2006.01)

(52) U.S. Cl.
CPC ........... *H04L 41/0866* (2013.01); *H04W 4/02* (2013.01); *H04W 64/003* (2013.01); *G10L 2015/221* (2013.01); *G10L 2015/223* (2013.01)

(58) Field of Classification Search
CPC ..... H04W 12/00305; H04W 36/00837; H04W 36/165; G10L 15/22; G10L 15/26; G10L 2015/081; G10L 2015/223; G10L 15/04; G10L 15/1822; G10L 15/32; G10L 13/00; G10L 15/16; G10L 15/183; G10L 25/48; G10L 15/30; G10L 15/00; G10L 2015/088; H04L 12/2803; H04L 12/282; H04L 12/2827; H04L 67/10; H04L 12/281; H04L 12/2818; H04L 12/4625; H04L 63/0876; H04L 67/125; H04L 5/0035; H04L 63/20; H04L 67/18; H04L 67/22; H04L 2012/2841; H04L 2209/80; H04L 43/065; H04M 1/7255; H04M 2250/02; H04M 2250/74; H04M 3/42263; H04M 1/2535; G06Q 20/3224; G06Q 30/0267; G06Q 20/308; G06Q 20/321; H04R 2499/15; H04R 19/013; H04R 1/406; H04R 2420/07; G06F 3/167; G06F 16/90335; G06F 3/1224; G06F 40/295
See application file for complete search history.

(56) References Cited

U.S. PATENT DOCUMENTS

| | | | |
|---|---|---|---|
| 2008/0043939 A1* | 2/2008 | Sipher | H04M 3/53333 379/88.12 |
| 2009/0125499 A1* | 5/2009 | Cross | G06F 16/1824 |
| 2011/0258223 A1 | 10/2011 | Lim et al. | |
| 2013/0066551 A1* | 3/2013 | Bednar | G01C 21/362 701/526 |
| 2014/0108370 A1* | 4/2014 | Andri | G06Q 30/0267 707/706 |
| 2016/0062949 A1* | 3/2016 | Smith | H04W 64/00 702/150 |
| 2016/0381660 A1* | 12/2016 | Mittal | H04M 1/72519 455/421 |
| 2018/0088205 A1* | 3/2018 | Shamain | H04W 4/027 |
| 2018/0295598 A1* | 10/2018 | Donnellan | G01S 5/18 |
| 2018/0338341 A1* | 11/2018 | Murakami | H04M 1/6033 |
| 2018/0343138 A1* | 11/2018 | Murakami | H04L 12/282 |
| 2019/0311070 A1* | 10/2019 | Huang | G06K 9/3241 |
| 2020/0162911 A1* | 5/2020 | Dhanuka | H04W 12/00305 |

* cited by examiner

VOICE ENABLED SEARCHING FOR WIRELESS DEVICES ASSOCIATED WITH A WIRELESS NETWORK AND VOICE ENABLED CONFIGURATION THEREOF

BACKGROUND

More and more devices are capable of communicating wirelessly. The wireless communications may be between wireless devices and/or with the Internet. The wireless communications between wireless devices may be accomplished using one or more wireless protocols. For example, wireless devices may communicate directly with one another using Bluetooth (IEEE 802.15.1). Alternatively, wireless devices may communicate with each other or with the Internet via a wireless local area network, such as WiFi (IEEE 802.11). To communicate via a WiFi network, each of the WiFi devices may directly connect to the WiFi network via an access point (e.g., router). Bluetooth devices may connect to the WiFi network utilizing a Bluetooth-WiFi bridge.

The wireless devices (Bluetooth and/or WiFi) include devices that typically remain in same location (stationary devices) and devices that typically travel with a user and therefore change locations (mobile devices). The stationary devices may include, but are not limited to, televisions, appliances, entertainment systems, Internet enabled voice activated speakers (smart speaker, such as, Amazon Echo®), door locks, and security cameras. The mobile devices may include, but are not limited to, computers, tablets, Internet enabled phones (smart phones), Internet enabled watches (smart watches, such as, Apple Watch®)), activity trackers (e.g., Fitbit®)), electronic-readers (e.g., Kindle®), remote controls, headphones, toys and remote starters.

With the increase in the number and type of wireless devices that are in use every day comes a need for an increase in performance (e.g., speed, bandwidth, range) of wireless (e.g., WiFi) networks. Increased speed may be necessary to handle the increasing capabilities of many of these devices, such as ultra-high definition video. Increased bandwidth may be required to handle the increased number of devices that are likely accessing the WiFi network. Increased range is required as the wireless devices are likely located at varying distances from an access point for the WiFi network so the WiFi network needs to be able to communicate further distances.

Higher speed WiFi networks such as those operating at 5 GHz (5G networks) have been deployed. However, many WiFi devices are still designed for lower speed networks such as those operating at 2.4 GHz (2.4G networks). Accordingly, it is often the case where WiFi networks are designed to operate at multiple frequencies (e.g., 2.4G and 5G). A WiFi network may include a modem/gateway to connect to a broadband network (e.g., cable network, telco network, satellite network) provided by a service provider and a WiFi router to provide a WiFi access point to the broadband network. The WiFi router may include multiple antennae's (e.g., 2.4G and 5G) so they can operate at multiple frequencies. The modem/gateway and WiFi router may be combined in a single device (main access point).

Furthermore, the WiFi network may utilize WiFi network extenders in order to expand the bandwidth and range of the WiFi networks to areas that may not be capable of receiving a WiFi signal from the main access point. The network extenders may provide the ability to connect to one or more of the WiFi networks (e.g., 2.4G, 5G) provided by the main access point by transmitting the WiFi signal from the location of the network extender. The network extenders may communicate with the main access point via a wired (e.g., home electrical wiring, coaxial cable, Ethernet cable) connection or a WiFi connection.

FIG. 1 illustrates an example high level system diagram of a WiFi network 100 within a location. The WiFi network 100 may include a gateway/modem 110, a WiFi router 120 and one or more network extenders 130. The gateway/modem 110 is for communicating with a broadband network 140. The WiFi router 120 is connected to the gateway/modem 110 to provide a link between the WiFi network 100 and the broadband network 140. The WiFi router 120 may include one or more antennas to transmit and receive WiFi signals to enable communications with wireless devices 150. As the WiFi router 120 may not be capable of communicating with wireless devices 150 that are too far away, the network extenders 130 may be located at points remote from the WiFi router 120 to provide for additional WiFi communications with additional wireless devices 150. The network extenders 130 may provide a subset or all of the frequency bands of the WiFi router 120.

The location of the router 120 should be in close proximity to the gateway/modem 110. According to one embodiment, the gateway/modem 110 and the router 120 may be combined into a single component. The gateway/modem 110 and the router 120 may be located in a central part of the location and/or an area where most wireless traffic is expected. For example, the gateway/modem 110 and the router 120 may be located on the main floor in a residence or may be located in a home office. The extenders 130 may be located at locations that the WiFi signal from the router 120 is not strong, where sufficient WiFi traffic is expected, or where a quality WiFi signal is desired/required. For example, an extender 130 may be located on different floors from the router 120 or in a home office or an entertainment room where connectivity is important.

The wireless devices 150 connected to the router 120 or extenders 130 may be stationary devices (indicated as solid lines) or may be mobile devices (indicated by dashed lines). The wireless devices 150 may be connected to the access point (e.g., router 120, extender 130) that has the strongest signal strength. As illustrated, the router 120 is connected to three wireless devices 150 of which two are stationary and one is mobile, a first extender 130 (network extender 1) is connected to two wireless devices 150 of which both are mobile, and a second extender 130 (network extender 2) is connected to two wireless devices 150 of which one is stationary and one is mobile. The configuration of the wireless network 100 is not limited to any specific location for the router 120, any number or location of the extenders 130, any number or type of wireless devices 150 connected thereto, or any configuration for how the wireless devices 150 connect to the access points 120, 130. In fact, the number and type of wireless devices 150 and access point connectivity of the wireless devices 150 may vary over time as the wireless devices 150 move within the location.

The WiFi network 100 may be configured in such a fashion that the router 120 and the extenders 130 have the same service set identifier (SSID) and password so that once a wireless device 150 connects to the network 100 via any access point it can be connected the network 100 via any other access point without having to select another SSID or enter another password. Furthermore, the wireless device 150 can transfer connectivity from one access point to another based on, for example, signal strength (e.g., as the wireless device 150 moves within the location) or congestion (e.g., current access point has too many devices connected thereto).

SUMMARY

A method for providing voice enabled searching for a wireless device associated with a wireless network. The method comprises receiving a voice search query for the wireless device at a device capable of capturing voice. The voice capturing device is configured to communicate with a network controller for the wireless network, wherein the network controller is to define a configuration for the wireless network including identifying location of access points associated therewith and track wireless devices connected to the access points. The voice search query is sent to a voice recognition engine to convert the voice search query to a text search query. The text search query is received from the voice recognition engine and forwarded to the network controller for processing. A response from the network controller regarding the text search query is received, wherein the response identifies location of an access point. Announcing the response as a voice response.

A device for providing voice enabled searching for a wireless device associated with a wireless network. The device comprising a wireless interface to communicate with one or more wireless devices. A processor is communicatively coupled to a memory for storing network configuration information. The network configuration information includes identification of location of access points included in the wireless network and wireless devices connected to the access points. A computer-readable storage medium to store instructions that when executed by the processor cause the processor to receive a text search query from a voice recognition engine. The voice recognition engine converted a voice search query received to a text search query. The configuration information in the memory is searched based on the text search query, wherein the search provides a result that identifies location of an access point. Provide the result to a speaker in order to announce the result.

A non-transitory computer-readable storage medium containing stored instructions that when executed by a processor cause the processor to enable voice enabled searching for a wireless device associated with a wireless network by receiving a voice search query for the wireless device at a device capable of capturing voice. The voice capturing device is configured to communicate with a network controller for the wireless network. The network controller is to define a configuration for the wireless network including identifying location of access points associated therewith and track wireless devices connected to the access points. The voice search query is sent to a voice recognition engine to convert the voice search query to a text search query. The text search query is received from the voice recognition engine. The text search query is forwarded to the network controller for processing. A response is received from the network controller regarding the text search query, wherein the response identifies location of an access point. The response is announced as a voice response.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

Multiple wireless devices may connect to a WiFi network within a location (e.g., residence, business). The wireless devices may include stationary devices (e.g., televisions, appliances, entertainment systems, door locks, security cameras) and mobile devices (e.g., computers, tablets, phones, watches, activity trackers, e-readers). The mobile devices may move around the location and be connected to various access points within the location over time. Devices may connect and disconnect to the WiFi network over time. The connecting and disconnecting of the mobile devices may be based on, for example, the devices entering and leaving the location the WiFi network is located in, the devices being in and out of range of the WiFi network and/or the devices being powered on or off. The number, type, and specific devices connected to the network may change over time.

FIGS. 2A-D illustrate several examples of wireless devices being connected to an example WiFi network at different points in time. The example WiFi network of FIGS. 2A-D includes a gateway/router (main access point) 200, a first network extender 210 and a second network extender 220. As illustrated, the gateway/router 200 is located on a main level (e.g., kitchen, family room), the first network extender 210 is located on an upper level (e.g., bedrooms) and a second network extender 220 is located on a lower level (e.g., game room, office). The configuration of the WiFi network is not limited to any specific number of network extenders and/or location of any of the access points (gateway/router 200, network extenders 210, 220). For example, the network extenders 210, 220 could be associated with specific rooms in the location rather than floors. For ease of illustration, FIGS. 2A-D simply illustrate the connectivity of mobile devices and do not illustrate connectivity of any stationary devices. While it is possible that the stationary devices may lose connectivity and/or may connect to different access points over time, these devices may not move but rather may stay in the same location.

It should be noted that the access points and the wireless devices connected thereto may be identified by assigned names that are easy to remember. For example, the access points may be identified by location (e.g., main floor, master bedroom, basement, office) and the wireless devices may be identified by user name and device type (e.g., dad's phone, work laptop, Bob's Kindle®).

Figure 1:
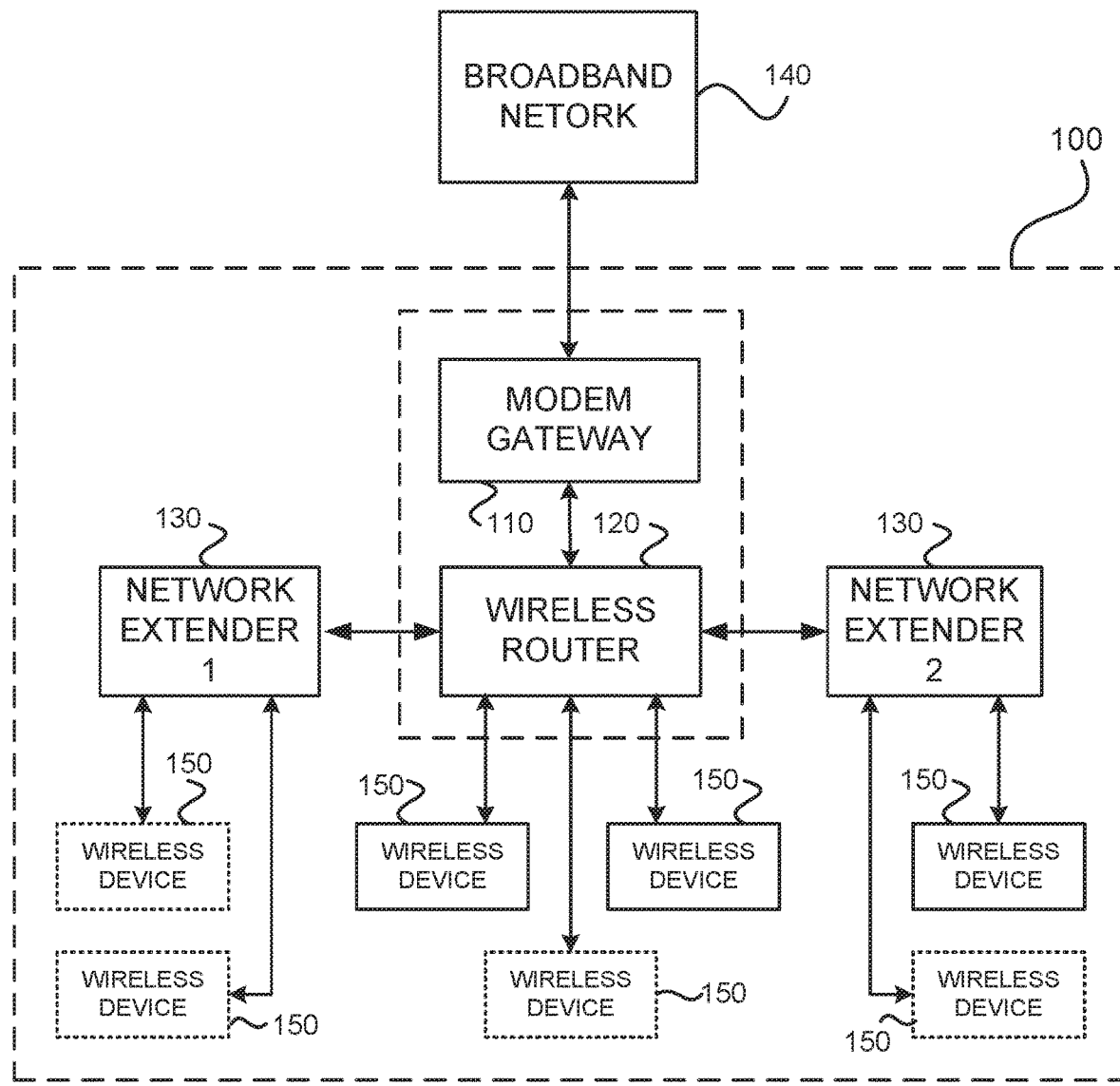
FIG. 1 illustrates an example high level system diagram of a WiFi network within a location.
Figure 2A:
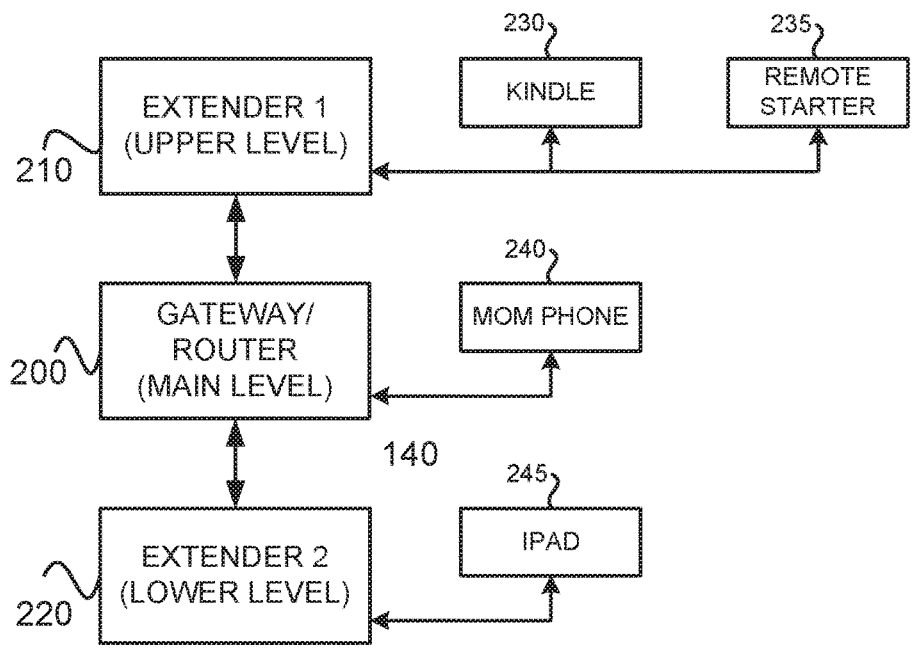
FIGS. 2A-D illustrate several examples of wireless devices being connected to an example WiFi network at different points in time, according to one embodiment.

FIG. 2A illustrates an example connectivity of mobile devices to the WiFi network at a first point in time (e.g., middle of the day). As illustrated, an e-reader (e.g., Kindle®) 230 and a remote starter with WiFi connectivity 235 are connected to the first network extender 210, a smart phone (e.g., mom's phone) 240 is connected to the gateway/ router 200 and a tablet (e.g., iPad®) 245 is connected to the second network extender 220.

Figure 2B:
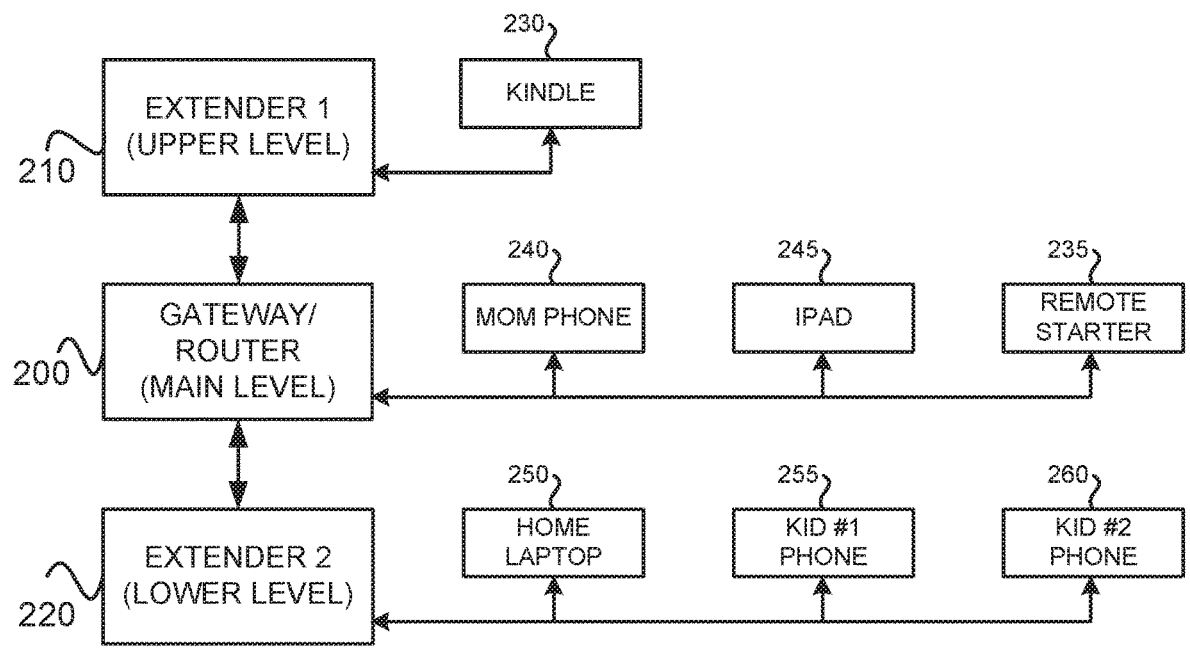

FIG. 2B illustrates an example connectivity of mobile devices to the WiFi network at a second point in time (e.g., when kids get home from school). As illustrated, the Kindle® 230 is still connected to the first network extender 210. The mom's phone 240 is still connected to the gateway/router 200, the iPad® 245 moved from the second network extender 220 to the gateway/router 200, and the remote starter 235 moved from the first network extender 210 to the gateway/router 200. The second network extender 220 now has a laptop computer (e.g., home laptop) 250 and two smart phones (e.g., first kid phone 255, second kid phone 260) connected thereto.

Figure 2C:
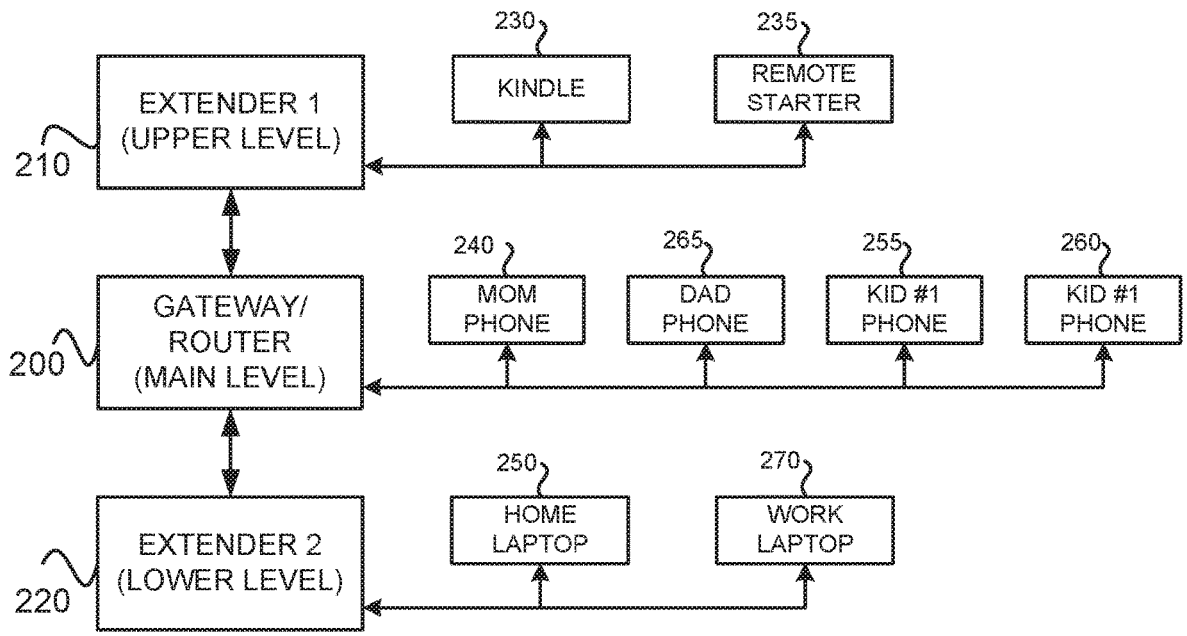

FIG. 2C illustrates an example connectivity of mobile devices to the WiFi network at a third point in time (e.g., dinner time). As illustrated, the Kindle® 230 is still connected to the first network extender 210 and the remote starter 235 has moved back from the gateway/router 200 to the first network extender 210. The mom's phone 240 is still connected to the gateway/router 200, the first kid phone 255 and the second kid phone 260 have moved from the second network extender 220 to the gateway/router 200 and an additional smart phone (e.g., dad's phone) 265 has connected thereto. The home laptop 250 remains connected to the second network extender 220 and an additional laptop computer (e.g., work laptop) 270 is now connected thereto. The iPad® 245 is no longer connected to the network. This could be because the iPad® 245 has left the location or lost connectivity for some reason (e.g., powered off, out of range).

Figure 2D:
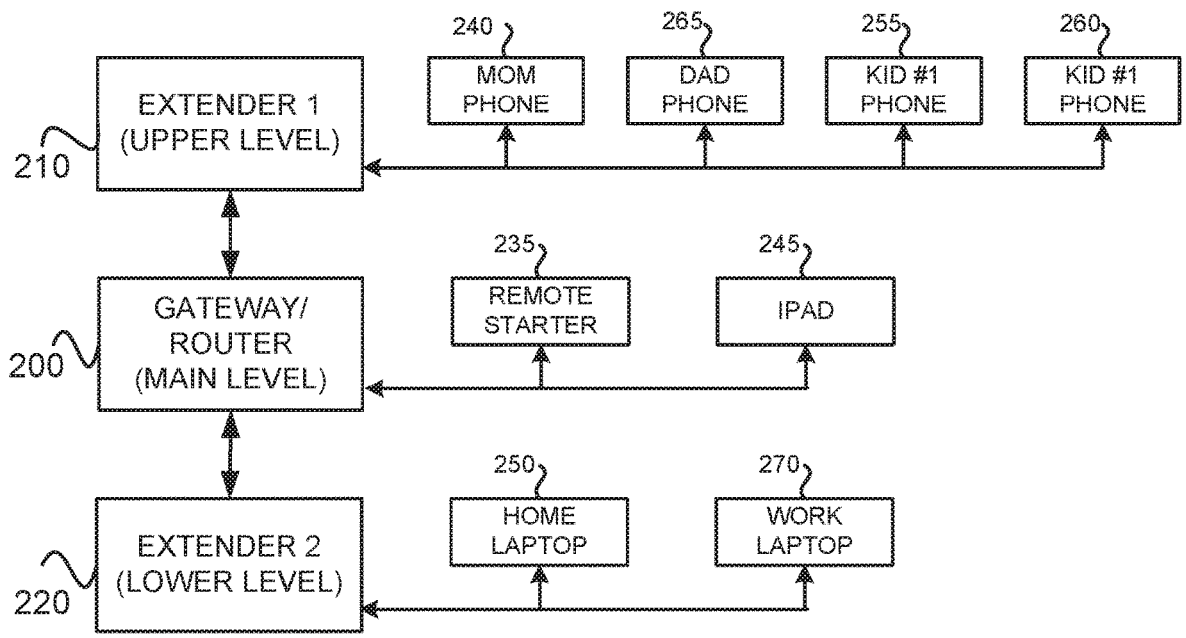

FIG. 2D illustrates an example connectivity of mobile devices to the WiFi network at a fourth point in time (e.g., bed time). As illustrated, all of the phones 240, 255, 260, 265 have moved from the gateway/router 200 to the first network extender 210. The remote starter 235 has again moved from the first network extender 210 to the gateway/router 200 and the iPad® 245 has connected to the gateway/router 200. The laptops 250, 270 remain connected to the second network extender 220. The Kindle® 230 is no longer connected to the network (e.g., left, powered off, out of range).

Figure 3:
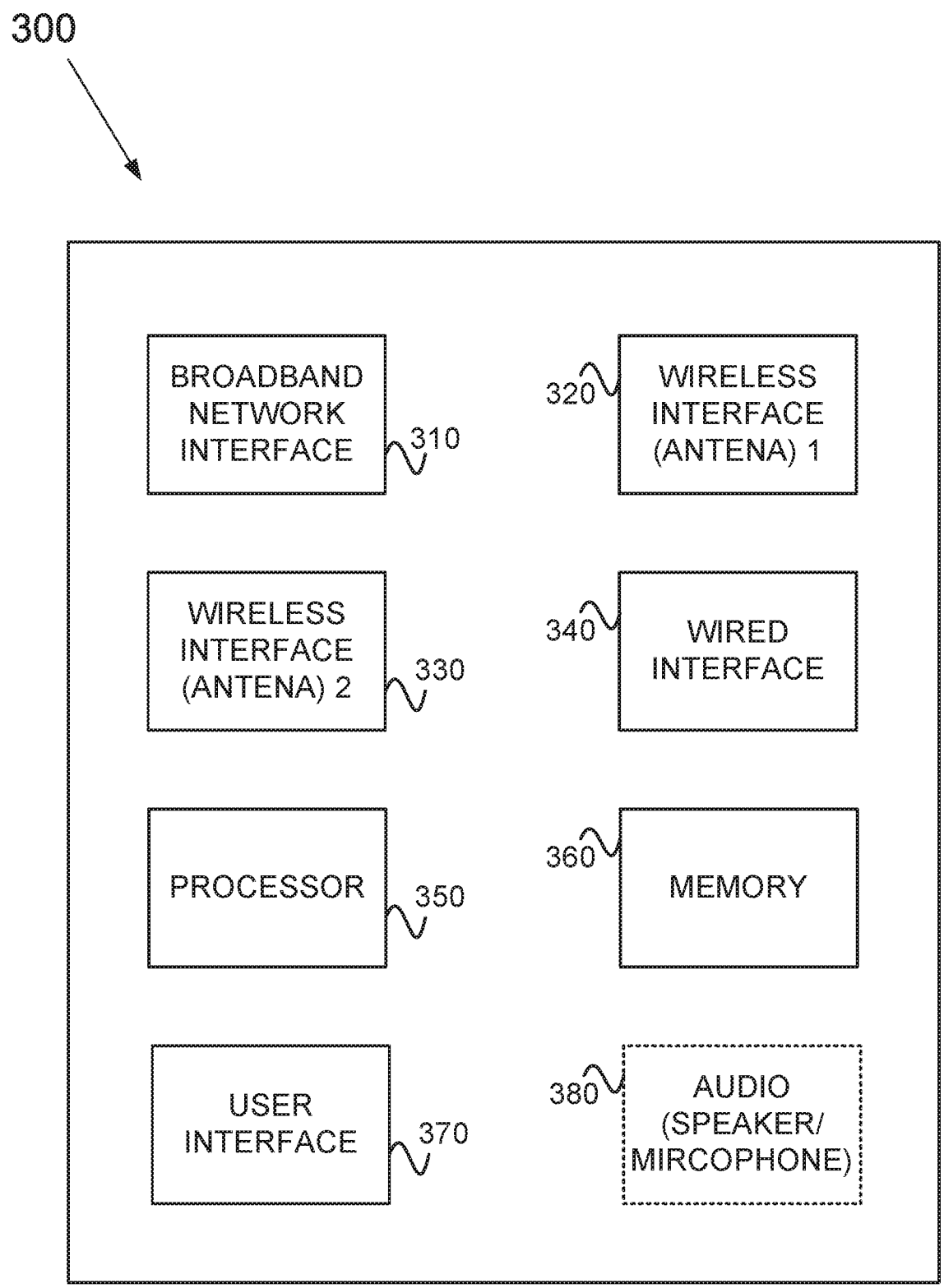
FIG. 3 illustrates an example high level functional diagram of a gateway/router for a WiFi network, according to one embodiment.

FIG. 3 illustrates an example high level functional diagram of a gateway/router 300. The gateway/router 300 may include a broadband network interface 310, a first WiFi interface (antenna) 320, a second WiFi interface (antenna) 330, a wired interface 340, a processor 350, memory 360 and a user interface 370. According to one embodiment, the gateway/router 300 may optionally include an audio module 380.

The broadband network interface 310 is to provide connectivity to and communications with a broadband network. The network interface 310 may include a connector, for example, a coaxial connector for receiving a coaxial cable and associated protocols for providing the necessary communications with the broadband network (e.g., receiving data from and transmitting data to). The broadband network provides access to external content and external systems including the Internet.

The first and second WiFi interfaces (antennas) 320, 330 are to provide WiFi communications between the gateway/router 300 and wireless devices (establish WiFi networks). The first WiFi interface 320 may be to establish a WiFi network operating at a first frequency (e.g., 5 GHz network pursuant to IEEE 802.11a) and the second WiFi interface 330 may be to establish a WiFi network operating at a second frequency (e.g., 2.4 GHz network pursuant to IEEE 802.11b,g). According to one embodiment, it is possible that a single chip includes multiple antennas and can provide communications at different frequencies (e.g., 2.4 and 5 GHz network pursuant to IEEE 802.11n). The wireless devices may utilize the gateway/router 300 to communicate with other wireless devices within the location or may use it as an access point to connect to the broadband network.

The wired interface 340 is to provide wired communications between the gateway/router 300 and other devices. The other devices may be computing devices using the gateway/router 300 to communicate with wireless devices within the location or access the broadband network. The other devices may be network extenders that extend the range of the wireless network within the location. The wired interface 340 may include a connector (e.g., coaxial, Ethernet, USB) to receive an appropriate cable and associated protocols for receiving and transmitting data thereover.

The processor 350 is to control the operation of the gateway/router 300 and also to configure and control the WiFi network (act as a network controller). The processor 350 is also to execute computer-executable instructions (e.g., software, apps). The computer executable instructions, when executed, may cause the processor 350 to perform various functions including configuring the WiFi network, monitoring activity on the WiFi network, analyzing the activity to determine usage, performance, statistics and/or analytics, and making adjustments as necessary. The adjustments may include transitioning wireless devices from one access point to another based on various criteria including signal strength and congestion.

The memory 360 is to store the computer-executable instructions and/or other data. The other data may include, for example, configuration data (e.g., set-up of the WiFi network), connectivity data (e.g., wireless devices actively connected to the WiFi network, signal strength of connected devices, congestion of access points) and/or activity data (e.g., when a wireless devices connects to an access point and whether it was a new connection or a transfer from another access point, when a device losses connectivity to an access point). The gateway/router 300 may receive data related to what is connected to the network extenders from the network extenders. The data may be received from the network extenders, for example, when wireless devices connect or disconnect from the network extenders, when the wireless devices communicate with the broadband network which requires communications with the gateway/router 300 and/or at defined intervals (e.g., every few seconds).

The memory 360 may be located on the processor 350 and/or may be separate from the processor 350. The memory 360 storing the computer-executable instructions may be computer-readable memory so that the processor 350 can read and execute the computer-executable instructions.

The user interface 370 may include, for example, lights to provide a user an indication about the operational status thereof. The user interface 370 may also include, for example, switches, buttons or the like to enable the user to, for example, power on/off and/or reset the gateway/router 300.

The optional audio module 380 may include a microphone and a speaker to enable verbal commands from a user to be captured by the gateway/router 300 and to provide verbal responses to the user.

A user may be able to configure the gateway/router 300, and in fact a WiFi network that the gateway router 300 is part of, via a user interface. The user interface may be provided by connecting to a web page hosted on a server provided by, for example, the broadband service provider that can be accessed via any number of devices capable of connecting to the Internet. The server may communicate with the gateway/ router 300 in order to obtain information about the WiFi network. The user interface may be provided by an app that can be run on various wireless devices (e.g., smart phones, tablets). The app may connect directly to the gateway/router 300, may connect to the gateway/router via the Internet and/or may connect to a broadband service provider server which communicates with the gateway/router 300.

The user interface may be a voice activated user interface. The voice activated user interface may require a device that is capable of capturing voice commands. The voice capturing device may be a wireless device (e.g., smart phone, tablet) running an app associated with the WiFi network and/or the broadband service provider. The voice capturing device may be a smart speaker (e.g., Amazon Echo®, Google Home®) running an app associated with the WiFi network and/or the broadband service provider. The voice capturing device may be a router/gateway (access point) that is equipped with the optional audio module 380. Regardless of what device is used to capture the voice commands, the device may need to provide the voice commands captured to a voice recognition/processing engine (e.g., Alexa®, Google Home®, Cortana®) that may convert the voice commands to text commands and may send the text commands to the gateway/router 300 and/or to the broadband service provider server.

In addition to configuring the WiFi network, the user interface may enable the user to access data regarding the WiFi network that has been collected (e.g., configuration, connectivity, activity). The user interface may provide the user the ability to analyze information about the WiFi network that may be generated from the data that was collected. The information may include, for example, usage, performance, statistics and/or analytics. This information may be utilized by the user to manage the network and make any necessary changes. The changes may include adjusting the channel that one or more of the access points is utilizing or adjusting the channel width of the access points (e.g., reconfiguring the WiFi network). The information may be used by the processor 350 to make necessary changes including rerouting a wireless device from one access point to another based on various parameters including but not limited to signal strength and congestion.

The usage, performance, statistics and/or analytics information may be generated by the processor 350. Alternatively, the information may be generated by a service provider. The service provider may maintain one or more servers in the cloud that receive the data collected from the gateway/router 300 and process the data to generate the usage, performance, statistics and/or analytics information. The data may be forwarded from the gateway/router 300 at, for example, defined intervals (e.g., every night, once a week), when trouble shooting is required and/or when the user opens the user interface. Alternatively, the server may be capable of retrieving the data from the gateway/router 300 when, for example, they need to troubleshoot the wireless network, recommend changes/upgrades to the wireless network (e.g., to handle problems or optimize performance and/or cost) and/or perform maintenance on the wireless network. According to one embodiment, the information may be generated as a collaboration between the processor 350 and the cloud server for the service provider.

As many of the mobile wireless devices that connect to a WiFi network are relatively small (e.g., phones, tablets, e-readers, remote starters, toys, earphones, laptops) and are often moved around within a location, it is possible that the devices may get misplaced. If a wireless device was utilized throughout the location a user may not know where to search when the device is first noticed to be missing.

As the WiFi network configuration and the connectivity of the wireless devices to the WiFi network (e.g., which access point it is connected to) may be captured in, for example, the memory 360, it is possible to search the memory 360 to assist in finding mobile devices that may have been misplaced. Knowing what access point the wireless device is connected to, can assist in a search for the device. For example, if the access points are located on various floors a determination that the wireless device is connected to an access point on a certain floor would lead to a determination that the wireless device may be located on that floor and the search may be limited to that floor. If the access points were associated with specific rooms a determination of what access point the wireless device is connected to could focus the search on a specific room.

The user may utilize the user interface to determine which access point a missing wireless device is connected to. For example, the user interface, whether provided by a webpage or an app, may provide a view of the WiFi network configuration including the wireless devices that are connected thereto (e.g., the views illustrated in FIGS. 2A-2D). The user may then search the view of WiFi network configuration to determine what access point the wireless device is connected thereto. For example, if the user could not find the remote starter they could pull up a system diagram (e.g., FIG. 2D) and determine that the remote starter 235 was connected to the gateway/router 200 that is located on the main floor. It should be noted that on the system configuration the gateway/router 200 may simply be identified by its preferred name (e.g., main AP, main floor, main level, family room).

Rather than provide the WiFi network configuration, the user interface may provide a list of wireless devices that are connected to the WiFi network. The list may be organized, alphabetically or in a manner defined by the user. The list may also include an identification of the access point that each wireless device is connected to. The user may search the list of wireless devices to determine the access point that the wireless device is connected to.

Rather than requiring the user to visually search for the wireless device, the user interface may include a search feature. That is, the user may tell the user interface the wireless device that it is looking for and the user interface may return the result (e.g., which access point the device is connected to). Using the same example, if the user searched for the remote starter 235 the user interface would return an answer that it was connected to the gateway/router 200 that is located on the main floor. The search may utilize the preferred name of the device and the results may simply provide the preferred name of the access point.

According to one embodiment, a voice capturing device may be utilized to provide a voice activated user interface. The voice activated user interface may enable a user to search for a wireless device by speaking a voice search query. For example, using the same search described above, the user may say "Search Remote Starter" or "Find Remote Starter" in order to initiate the search for the access point that the device is connected to.

Figure 4:
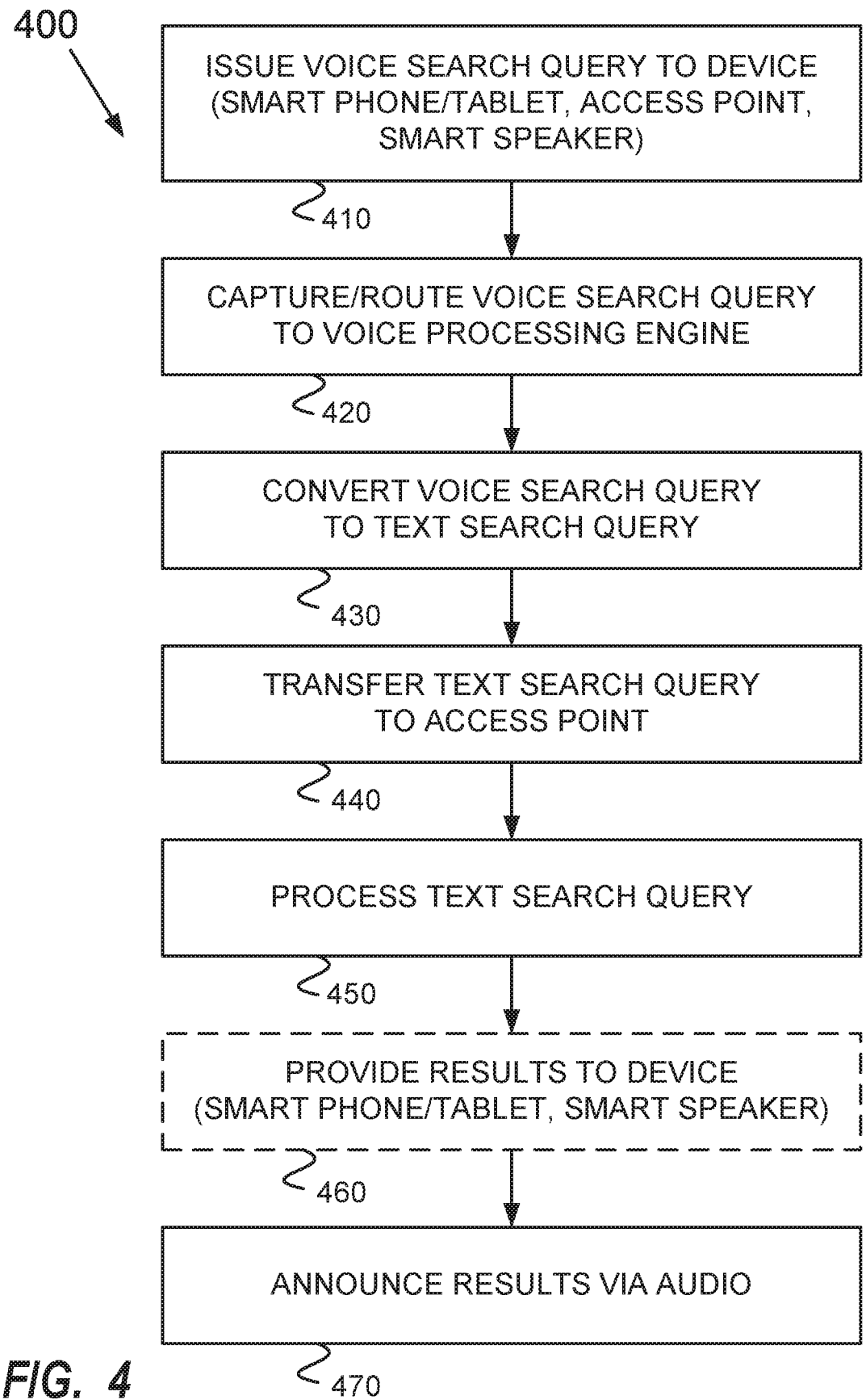
FIG. 4 illustrates an example method for imitating a voice enabled search for a wireless device, according to one embodiment.

FIG. 4 illustrates an example method 400 for initiating a voice enabled search for a wireless device. The user may issue a voice search query to a device that is capable of capturing voice commands and thus acting as the voice activated user interface 410. The voice capturing device may be a wireless device (e.g., smart phone, tablet). For example, iPhone's and iPad's include Ski® which is a voice interactive system. The wireless device may include an app associated with the WiFi network and/or the broadband service provider. In order to process the voice commands the app may need to be running on the wireless device. The voice commands may initiate the app to run on the wireless device.

The voice capturing device may be a smart speaker (e.g., Amazon Echo®, Google Home®). The smart speaker may include an app associated with the WiFi network and/or the broadband service provider. In order to process the voice commands the app may need to be running on the smart speaker. The voice commands may initiate the app to run on the smart speaker. The voice capturing device may be a router/gateway (access point) for the WiFi network that is equipped with the optional audio module 380.

The voice capturing device (e.g., smart phone, tablet, smart speaker, access point) may capture the voice search query and may route it to a voice recognition/processing engine (e.g., Alexa®, Google Home®, Cortana®) 420. The voice recognition/processing engine may convert the voice search query to a text search query that may be processed by the access point 430. The text search query may then be sent to the access point 440. The access point processes the text search query to determine what access point the wireless device in question is connected to 450. If the voice capturing device was not the access point, the results may be provided to the voice capturing device (e.g., smart phone, tablet, smart speaker) 460. The voice capturing device (e.g., smart phone, tablet, smart speaker, access point) may then announces the results of the search to the user 470.

As described above, the various steps of the method may be completed by different computing devices. For example, steps 410, 420, 470 may be completed by various voice capturing devices, including but not limited to, a smart phone, a tablet, a smart speaker or a voice enabled access point. Steps 430, 440 may be performed by a voice recognition/processing engine. Step 450 (and 460 if required) may be performed by the access point.

Computer-executable instructions (e.g., software, apps) may be stored on a computer-readable storage medium (e.g., 360). The computer-executable instructions when executed by a processor (e.g., 350) may cause the processor to perform the method 400. The method 400 is in no way intended to be limited to the illustrated processes. Rather, additional processes can be added, processes can be combined, processes can be deleted, processes can be modified, and/or the order of the processes can be modified without departing from the current scope.

Figure 5A:
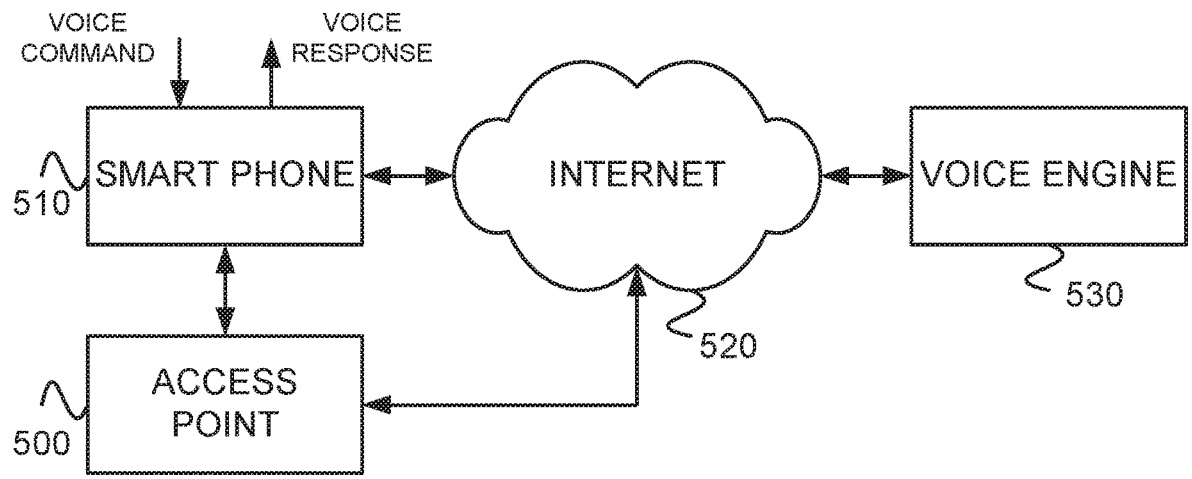
FIGS. 5A-C illustrate high level system diagrams of how the voice implemented user interface may be configured, according to one embodiment.
Figure 5B:
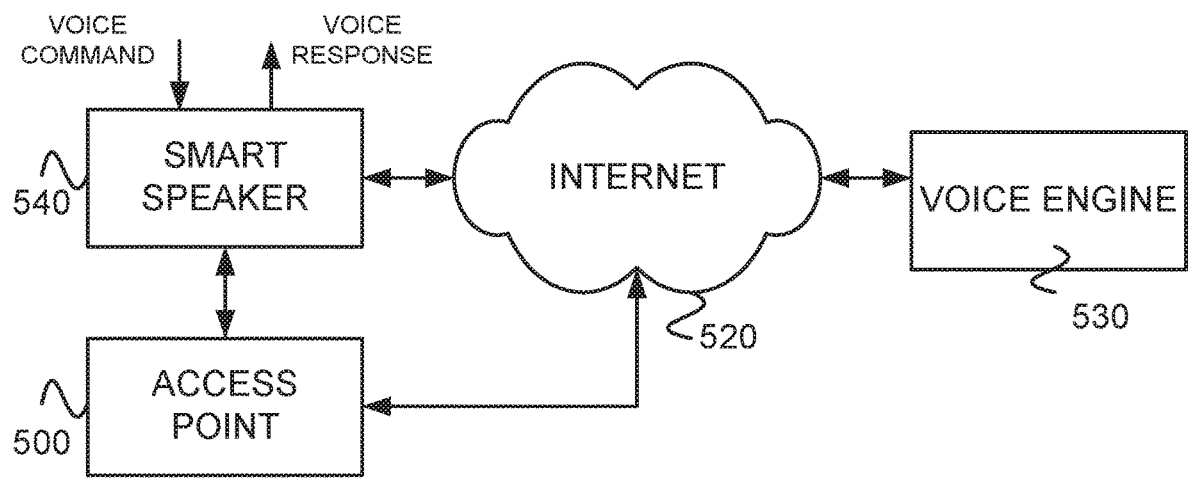
Figure 5C:
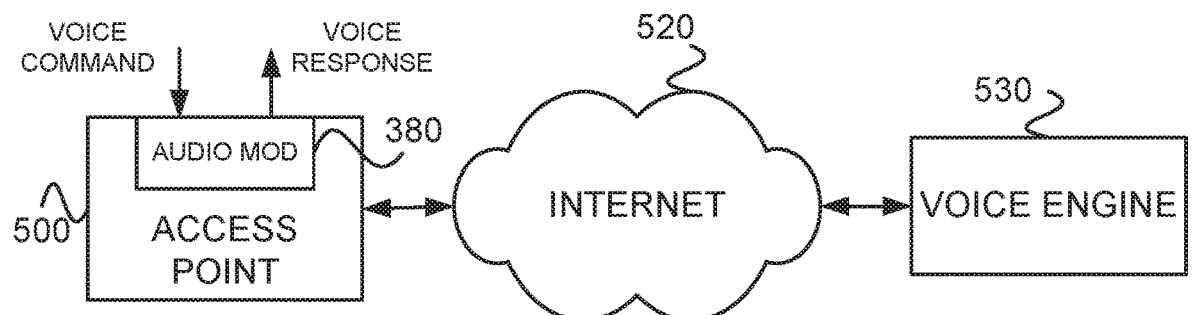

FIGS. 5A-C illustrate high level system diagrams of how the voice implemented user interface may be configured. FIG. 5A illustrates a smart phone 510 being the voice capturing device. The smart phone 510 may receive voice commands (e.g., voice search query) from a user and send them over the Internet 520 to the voice recognition/processing engine 530. The voice recognition/processing engine 530 may send the associated text commands (e.g., text search query) back to the smart phone 510 over the Internet 530. The smart phone 510 may then provide the text commands to the access point 500 (either directly or via the Internet 520) and the access point 500 may provide the results to the smart phone 510 (either directly or via the Internet 520). The smart phone 510 may then provide a voice response to the user.

FIG. 5B illustrates a smart speaker 540 being the voice capturing device. This embodiment works in the same fashion as FIG. 5A expect that the smart speaker 540 receives the voice commands and provides the voice response in place of the smart phone 510. FIG. 5C illustrates the access point 500 equipped with the optional audio module 380 as the voice capturing device. The access point 500 may directly communicate with the voice recognition/processing engine 530 via the Internet 520 to send the voice commands and receive the corresponding text commands. The access point 500 may provide a voice response to the user.

It is possible that a wireless device that a user is searching for may not be connected to an access point at the point they are searching. The wireless device may not be connected to the wireless network for various reasons including but not limited to, it was turned off, it has no power, it turned off WiFi connectivity, it is out of range or it is no longer within the location. According to one embodiment, in the event that the wireless device is not currently connected the search results may return the last known access point that the wireless device was connected to.

According to one embodiment, the search results may indicate whether the wireless device is currently connected or not. For example, if the wireless device is currently connected the search response may simply respond with the location (e.g., master bedroom) while if the wireless device is not currently connected it may respond with the location and an indication that it is no longer connected (e.g., last know location master bedroom). According to one embodiment, the search results may provide the last connection time (e.g., last connected to master bedroom July 1 at 3:30 pm).

The voice activated user interface has been described with regard to finding wireless devices that may have been misplaced within a residence. The voice activated user interface is in no way intended to be limited thereto. Rather, the voice activated user interface could be utilized to track inventory where the inventory may connect to a WiFi network. For example, if a company desires to know where a particular wireless printer is they can search for the specific printer and determine what access point it is connected to in order to give them an indication where it is. Alternatively, the voice activated user interface may request information about how many devices (possibly specific devices) are connected to a specific access point. For example, a user may ask "how many iPads® are in bay 3" and after converting the voice command to a text command a search may be performed and provide a voice answer "13".

The voice activated user interface has been described with respect to search queries but is in no way intended to be limited thereto. Rather, the voice activated user interface could be utilized to initiate various functions verbally including configuring or reconfiguring the WiFi network (voice configuration commands) as may be required. The voice commands may be sent to the voice recognition/processing engine for conversion to text commands that may be processed by the access point. The configuring and/or reconfiguring commands may result in, for example, an analysis of the WiFi network being performed and changes being made thereto that may include changes to channel and/or channel bandwidth.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

We claim:

1. A method for providing voice enabled searching for finding wireless devices associated with a wireless network, the method comprising:
receiving, at a voice capturing device, a voice search query for locating a wireless device that has been misplaced or has an unknown location at the voice capturing device that is configured to communicate with a network controller for the wireless network, wherein the network controller is to define a configuration for the wireless network including identifying locations of access points associated therewith and track connectivity of wireless devices associated with each of the access points, respectively, wherein the access points include a wireless router and one or more wireless network extenders connected thereto that are dispersed on different levels/floors or in specific rooms of a building;
sending the voice search query to a voice recognition engine to convert the voice search query to a text search query;
receiving the text search query from the voice recognition engine;
forwarding the text search query to the network controller for processing;
receiving a response from the network controller regarding the text search query, wherein,
the response identifies a location of a current access point, among the wireless router and the one or more wireless network extenders, to which the wireless device is currently connected in a condition that the network controller determines that the wireless device is currently connected to one of the access points of the wireless network, or
the response identifies a location of a last known access point, among the wireless router and the one or more wireless network extenders, to which the wireless device was last connected in a condition that the network controller determines that the wireless device is not currently connected to any of the access points of the wireless network; and
announcing the response as a voice response indicating the location of the current access point to which the wireless device is currently connected or the location of the last known access point to which the wireless device was last connected, wherein the voice response identifies a particular level/floor or specific room of the building where the wireless device is currently located or was last known to be located.

2. The method of claim 1, wherein the voice capturing device is an Internet enabled phone.

3. The method of claim 1, wherein the voice capturing device is a tablet computer.

4. The method of claim 1, wherein the voice capturing device is a voice activated speaker.

5. The method of claim 1, wherein the voice capturing device is an access point for the wireless network that is equipped with voice capturing functionality.

6. The method of claim 1, wherein, in the condition that the network controller determines that the wireless device is not currently connected to any of the access points of the wireless network, the response also identifies a last connection time at which the wireless device was last connected to the last known access point, and the voice response also indicates the last connection time of the wireless device.

7. The method of claim 1, further comprising:
receiving a voice configuration command for the wireless network;
sending the voice configuration command to the voice recognition engine to convert the voice configuration command to a text configuration command;
receiving the text configuration command from the voice recognition engine; and
forwarding the text configuration command to the network controller for processing, wherein the network controller configures the wireless network in response to the text configuration command.

8. A device for providing voice enabled searching for finding wireless devices associated with a wireless network, the device comprising:
a wireless interface to communicate with one or more of the wireless devices;
a processor communicatively coupled to a memory storing network configuration and device connectivity information, wherein the network configuration and device connectivity information includes identification of locations of access points included in the wireless network and the wireless devices associated with each of the access points, respectively, wherein the access points include a wireless router and one or more wireless network extenders connected thereto that are dispersed on different levels/floors or in specific rooms of a building; and
a computer-readable storage medium to store instructions that when executed by the processor cause the processor to:
receive, from a voice recognition engine, a text search query for locating a wireless device that has been misplaced or has an unknown location, wherein the voice recognition engine converted a voice search query received from a voice capturing device, to the text search query;
search the network configuration and device connectivity information in the memory based on the text search query, wherein,
the search provides a result that identifies a location of a current access point, among the wireless router and the one or more wireless network extenders, to which the wireless device is currently connected in a condition that the network configuration and device connectivity information indicates that the wireless device is currently connected to one of the access points of the wireless network, and
the search provides a result that identifies a location of a last known access point, among the wireless router and the one or more wireless network extenders, to which the wireless device was last connected in a condition that the network configuration and device connectivity information indicates that the wireless device is not currently connected to any of the access points of the wireless network; and
provide the result to a speaker of the voice capturing device in order to announce the result as a voice response indicating the location of the current access point to which the wireless device is currently connected or the location of the last known access point to which the wireless device was last connected, wherein the voice response identifies a particular level/floor or specific room of the building where the wireless device is currently located or was last known to be located.

9. The device of claim 8, wherein, in the condition that the network configuration and device connectivity information indicates that the wireless device is not currently connected to any of the access points of the wireless network, the instructions when executed further cause the processor to identify a last connection time at which the wireless device was last connected to the last known access point, and the last connection time of the wireless device is also announced by the speaker as the voice response.

10. The device of claim 8, further comprising:
a microphone to receive the voice search query for locating the wireless device, wherein the instructions when executed further cause the processor to send the voice search query to the voice recognition engine; and
the speaker to announce the result.

11. The device of claim 10, wherein the instructions when executed further cause the processor to:
receive a voice configuration command for the wireless network;
send the voice configuration command to the voice recognition engine to convert the voice configuration command to a text configuration command;
receive the text configuration command from the voice recognition engine; and
configure the wireless network in response to the text configuration command.

12. A non-transitory computer-readable storage medium containing stored instructions that when executed by a processor cause the processor to enable voice enabled searching for finding wireless devices associated with a wireless network by:
receiving, at a voice capturing device, a voice search query for locating a wireless device that has been misplaced or has an unknown location at a voice capturing device that is configured to communicate with a network controller for the wireless network, wherein the network controller is to define a configuration for the wireless network including identifying locations of access points associated therewith and track connectivity of wireless devices associated with each of the access points, respectively, wherein the access points include a wireless router and one or more wireless network extenders connected thereto that are dispersed on different levels/floors or in specific rooms of a building;
sending the voice search query to a voice recognition engine to convert the voice search query to a text search query;
receiving the text search query from the voice recognition engine;
forwarding the text search query to the network controller for processing;
receiving, at the voice capturing device, a response from the network controller regarding the text search query, wherein,
the response identifies a location of a current access point, among the wireless router and the one or more wireless network extenders, to which the wireless device is currently connected in a condition that the network controller determines that the wireless device is currently connected to one of the access points of the wireless network, or
the response identifies a location of a last known access point, among the wireless router and the one or more wireless network extenders, to which the wireless device was last connected in a condition that the network controller determines that the wireless device is not currently connected to any of the access points of the wireless network; and
announcing the response as a voice response indicating the location of the current access point to which the wireless device is currently connected or the location of the last known access point to which the wireless device was last connected, wherein the voice response identifies a particular level/floor or specific room of the building where the wireless device is currently located or was last known to be located.

13. The non-transitory computer-readable storage medium of claim 12, wherein, in the condition that the network controller determines that the wireless device is not currently connected to any of the access points of the wireless network, the instructions when executed further cause the processor to identify a last connection time at which the wireless device was last connected to the last known access point, and the voice response also indicates the last connection time of the wireless device.

14. The non-transitory computer-readable storage medium of claim 12, wherein the instructions when executed further cause the processor to:
receive a voice configuration command for the wireless network;
send the voice configuration command to the voice recognition engine to convert the voice configuration command to a text configuration command;
receive the text configuration command from the voice recognition engine; and
forward the text configuration command to the network controller for processing, wherein the network controller configures the wireless network in response to the text configuration command.

* * * * *